March 26, 1963 E. BROWN 3,082,952

ELECTRIC CIRCUITS FOR GENERATING AN OUTPUT VOLTAGE WHICH IS APPROXIMATELY PROPORTIONAL TO A FUNCTION OF AN INPUT VOLTAGE

Filed June 24, 1958 2 Sheets-Sheet 1

INVENTOR
ERIC BROWN
BY [signature]
ATTORNEYS

March 26, 1963 E. BROWN 3,082,952

ELECTRIC CIRCUITS FOR GENERATING AN OUTPUT VOLTAGE WHICH IS APPROXIMATELY PROPORTIONAL TO A FUNCTION OF AN INPUT VOLTAGE

Filed June 24, 1958 2 Sheets-Sheet 2

INVENTOR
ERIC BROWN
BY Kirchstein, Kirchstein & Ottinger
ATTORNEYS 3,082,952
Patented Mar. 26, 1963

3,082,952

ELECTRIC CIRCUITS FOR GENERATING AN OUTPUT VOLTAGE WHICH IS APPROXIMATELY PROPORTIONAL TO A FUNCTION OF AN INPUT VOLTAGE

Eric Brown, King's Langley, England, assignor to The General Electric Company Limited, London, England Filed June 24, 1958, Ser. No. 744,279
Claims priority, application Great Britain July 17, 1957
39 Claims. (Cl. 235—197)

Figure 1:
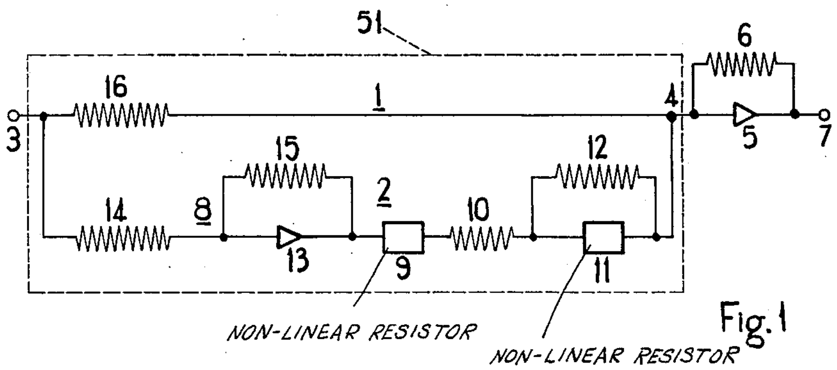

The present invention relates to electric circuits for generating an output voltage which is approximately proportional to a function of an input voltage.

Hereafter in this specification an electric circuit capable of generating an output voltage which is approximately proportional to a function of an input voltage will be referred to as a function generator. Function generators may be used particularly, but not exclusively, in electronic analogue computers.

Hereafter in this specification an electric circuit capable of generating an output voltage which is approximately proportional to a function of an input voltage, which function can be expressed as a convergent power series, will be referred to as a power series function generator and where said convergent power series is the series expansion of $e^x$ the circuit will be referred to as an exponential function generator. Similarly, an electric circuit capable of generating an output voltage which is approximately proportional to a trigonometrical function of an input voltage will be referred to as a trigonometrical function generator, and an electric circuit capable of generating an output voltage which is approximately proportional to an inverse trigonometrical function of an input voltage will be referred to as an inverse trigonometrical function generator.

One known kind of function generator comprises a cathode ray tube to which is fitted an opaque mask which covers part of the screen of the tube. The light from the spot on the cathode ray tube is monitored by a photoelectric cell, the output of which is fed back through an amplifier to the vertical deflection plates of the tube. Thus, as the spot moves across the tube for a given input voltage on the horizontal deflection plates, the voltage fed back from the photoelectric cell depends upon the position of the spot with respect to the edge of the mask. If the spot is above the edge of the mask, the voltage feedback moves it downwards towards the mask and, if the spot falls below the mask, the decrease in the feedback voltage causes the spot to move upwards. Because of the closed loop associated with the vertical deflection plates the spot follows the edge of the mask as the spot is deflected horizontally. If, therefore, the edge of the mask is shaped in accordance with the graph of the function which it is required to generate, the voltage appearing on the vertical deflection plates, which is taken as the output from the function generator, bears the required relationship to the horizontal deflecting voltage, which is the input to the function generator.

A known kind of trigonometrical function generator makes use of a potentiometer which may for example be a "flat-card," "shaped-card," or some form of "mechanical linkage" potentiometer.

These kinds of function generator and trigonometrical function generator are described in the section on curve followers and function generators starting on page 128 of "Introduction to Electronic Analogue Computers" by C. A. A. Wass.

The above mentioned function generators have a number of disadvantages in that the first kind requires a cathode ray tube, a comparatively costly piece of apparatus, and the second kind requires the manufacture of special potentiometers.

One object of the present invention is to provide a function generator in which these disadvantages are avoided.

Another object of the present invention is to provide a trigonometrical function generator which employs at least one non-linear resistor.

Where reference is made in this specification to non-linear resistors the term should be taken to mean devices the resistance of which varies with the applied voltage. Such non-linear resistors may for example comprise discs of silicon carbide and a disc of this material will have a current/voltage characteristic of the form:

$$I=KV^{\alpha}$$

where K and $\alpha$ are constants, and I is the current flowing in the non-linear resistor for a voltage V across it.

Unless otherwise stated the term "resistor," where it appears in this specification, should be taken to mean "linear resistor."

According to one aspect of the present invention a power series function generator comprises an adding circuit of the kind formed by an amplifier having a feedback path connected across it, first means arranged to supply to said adding circuit in dependence upon an input voltage a first current which is approximately proportional to the first term in a convergent power series that represents the function to be generated, and second means arranged to supply to said adding circuit in dependence upon said input voltage a second current which is approximately proportional to the sum of the second and successive terms in said convergent power series, the arrangement being such that the output from said adding circuit is substantially proportional to the sum of said first and second currents and is consequently approximately proportional to the required function of said input voltage.

According to a second aspect of the present invention a trigonometrical function generator, the series expansion of the trigonometrical function to be generated having a linear term, comprises: an input terminal; an output terminal; an adding circuit of the kind formed by an amplifier, said amplifier having an input and an output, the said amplifier output being connected to said output terminal, and a feedback path which is connected between said amplifier output and input; a first path connected between said input terminal and said amplifier input, said first path including a linear impedance and being arranged to supply a first input current proportional to the linear term in said series expansion to said amplifier input in dependence upon an input voltage supplied to said input terminal; and a second path connected between said input terminal and said amplifier input, said second path including a non-linear impedance and being arranged to supply a second input current proportional to the cubic and higher power terms of said series expansion to said amplifier input in dependence upon the input voltage supplied to said input terminal, the arrangement being such that the output from said adding circuit is substantially proportional to the sum of said first and second input currents and is consequently approximately proportional to the required trigonometrical function of said input voltage.

According to a third aspect of the present invention a trigonometrical function generator, the series expansion of the trigonometrical function to be generated having a constant term, comprises: first and second input terminals; an output terminal; an adding circuit of the kind formed by an amplifier, said amplifier having an input and an output and said amplifier output being connected to said output terminal, and a feedback path which is connected between said amplifier output and input; a first path connected between said first input terminal and said amplifier input, said first path including a linear impedance and being arranged to supply a first input current proportional to the constant term in said series expansion to said amplifier input in dependence upon a constant first input voltage supplied to said first input terminal; and a second path connected between said second input terminal and said amplifier input, said second path including a non-linear impedance and being arranged to supply a second input current proportional to the square and higher power terms of said series expansion to said amplifier input in dependence upon a second input voltage supplied to said second input terminal, the arrangement being such that the output from said adding circuit is substantially proportional to the sum of said first and second currents and is consequently approximately proportional to the required trigonometrical function of said second input voltage.

According to a fourth aspect of the present invention an inverse trigonometrical function generator, the series expansion of the trigonometrical function corresponding to the inverse trigonometrical function to be generated having a linear term, comprises an amplifier having an input path and first and second feedback paths, the arrangement being such that when an input voltage is applied to said input path the current fed back by said first feedback path is approximately proportional to the linear term in said series expansion and the current fed back by said second feedback path is approximately proportional to the sum of the second and successive terms (that is to say the odd power terms starting with the third power) in said series expansion so that the output from said amplifier is approximately proportional to said inverse trigonometrical function of said input voltage.

According to a fifth aspect of the present invention an inverse trigonometrical function generator, the series expansion of the trigonometrical function corresponding to the inverse trigonometrical function to be generated having a constant term, comprises an amplifier having first and second input paths and a feedback path, the arrangement being such that when an input voltage is applied to the first input path a current is supplied to the said amplifier over the second input path approximately proportional to the constant term in said series expansion and the current fed back by said feedback path is approximately proportional to the sum of the second and successive terms (that is to say the even power terms starting with the second power) in said series expansion so that the output from said amplifier is approximately proportional to said inverse trigonometrical function of said input voltage.

According to a sixth aspect of the present invention a power series function generator comprises an adding circuit of the kind formed by an amplifier having a feedback path connected across it, first means arranged to supply to said adding circuit in dependence upon a first input voltage a first input current which is approximately proportional to the first term in a convergent power series that represents the function to be generated, second means arranged to supply to said adding circuit in dependence upon a second input voltage a second input current which is approximately proportional to the second term in said power series, and third means arranged to supply to said adding circuit in dependence upon said second input voltage a third input current which is approximately proportional to the sum of the third and successive terms of said power series, the arrangement being such that the output from the said adding circuit is substantially proportional to the sum of said first, second and third input currents and is consequently approximately proportional to the required function of said second input voltage.

Figure 2:
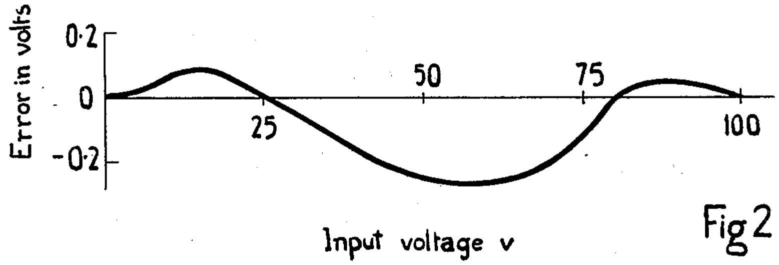
Figure 3:
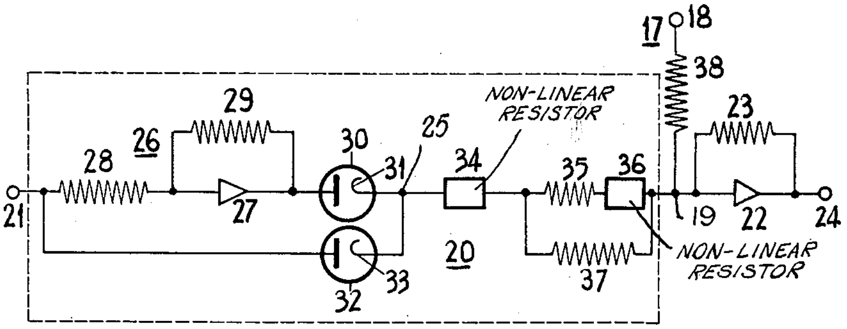
Figures 4, 5:
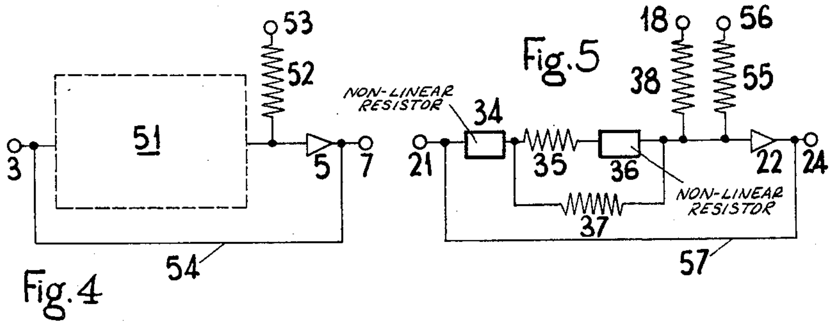
Figure 6:
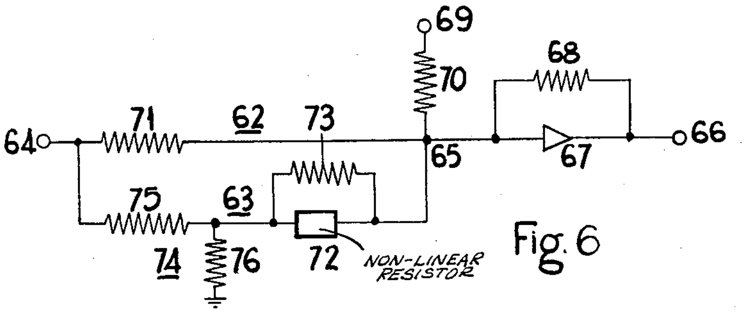

Five function generators in accordance with the present invention will now be described by way of example with reference to the accompanying drawings in which:

FIGURE 1 shows the circuit of a first trigonometrical function generator,

FIGURE 2 shows an error curve for the trigonometrical function generator of FIGURE 1, FIGURE 3 shows the circuit of a second trigonometrical function generator, FIGURE 4 shows, partly in schematic form, an inverse trigonometrical function generator derived from the trigonometrical function generator of FIGURE 1, FIGURE 5 shows, partly in schematic form, an inverse trigonometrical function generator derived from the trigonometrical function generator of FIGURE 3, and FIGURE 6 shows the circuit of an exponential function generator.

In the description that follows the components of the circuits of FIGURES 1 and 3 of the drawings will be ascribed values in accordance with particular trigonometrical function generators which have been built and operated, although it should be realised that this is done for the sake of simplicity only, and that the component values given are by way of example, the principles involved being equally applicable to circuits having different component values.

Hereafter in this specification expressions of the general form "sine law function generator" and "inverse sine law function generator" will be used in referring to trigonometrical function generators and inverse trigonometrical function generators respectively in which the said function is a sine or an inverse sine respectively.

Referring now to FIGURE 1 of the drawing, this shows the circuit of a sine law function generator comprising a linear resistance path 1 and a non-linear resistance path 2 connected in parallel between an input terminal 3 and a point 4, the arrangement being such that when an input voltage V, which is proportional to the input angle $\theta$, is applied to the input terminal 3 the current appearing at the point 4 is made up of two components; a first current component due to the linear path 1 being proportional to $\theta$, whilst the second current component due to the non-linear path 2 is proportional to $$-\left(\frac{\theta^3}{3!}-\frac{\theta^5}{5!}+\frac{\theta^7}{7!}-\cdots\right)$$

These two current components are added by a direct coupled amplifier 5 having a feedback resistor 6 so that the voltage appearing at an output terminal 7 is proportional of the sum $$\theta-\left(\frac{\theta^3}{3!}-\frac{\theta^5}{5!}+\frac{\theta^7}{7!}-\cdots\right)$$

i.e.

$$\theta-\frac{\theta^3}{3!}+\frac{\theta^5}{5!}-\frac{\theta^7}{7!}+\cdots$$

that is to say is proporational to sin $\theta$. The amplifier 5 has a high gain (greater than 20,000) and a low drift (less than 1 millivolt referred to the input grid over a period of several hours).

Considering now the non-linear path 2 in more detail, it comprises a sign-changer generally designated by the reference numeral 8, a non-linear resistor 9, a resistor 10, and a non-linear resistor 11 in series, the non-linear resistor 11 having a resistor 12 in parallel with it. The non-linear resistors 9 and 11 are in the form of discs of silicon carbide that have a current/voltage characteristic of the form $$I=KV^{\alpha}$$

where

K and $\alpha$ are constants equal to $3.2\times10^{-11}$ and 4.3 respectively,

I is the current flowing in the non-linear resistor for a voltage V across it, and the resistance of the non-linear resistor is 75 kilohms, the values of K, $\alpha$, and the resistance all being measured with a voltage across the disc of 50 volts.

Since the characteristics of silicon carbide are, to some extent, affected by humidity, the non-linear resistor used may, if necessary, be thoroughly dried and then sealed in an epoxy-resin plastic material before use.

The design of the non-linear path 2 and in particular the choice of the non-linear resistors 9 and 11 is principally dependent upon the power of the second term of the series, in the present case the cube term. The choice is to some extent modified by the values of the later terms of the series.

The sign-changer 8 comprises an amplifier 13 which is similar to the amplifier 5 with input and feedback resistors 14 and 15 respectively. The linear path 1 comprises a single resistor 16 connected between the input terminal 3 and the point 4. The values of the resistors are as follows:

| | |
|---|---|
| Resistor 6 | 150 kilohms. |
| Resistor 10 | 47 kilohms. |
| Resistor 12 | 3 megohms. |
| Resistor 14 | 1 megohm. |
| Resistor 15 | 1 megohm. |
| Resistor 16 | 95.5 kilohms. |

As stated the current appearing at the point 4 due to the non-linear path 2 is principally dependent upon the cube term in the expansion of sin $\theta$. It is observed that when a resistor is placed in series with a silicon carbide non-linear resistor the effective power law, that is to say the value of $\alpha$ for the combination, varies as the input voltage increases, from the value that is typical of the non-linear resistor to unity whilst for a parallel resistor, this change of power law occurs in the reverse direction for an increase in input voltage. It will be appreciated therefore that combined series and parallel resistors will enable a range of power laws to be obtained within given input voltage limits. With the arrangement shown in FIGURE 1 of the drawing an input voltage V, which is proportional to the input angle $\theta$, applied to the input terminal 3 will result in a voltage 100 sin $\theta$ appearing at the output terminal 7.

FIGURE 2 of the drawing shows the error curve for the sine law function generator of FIGURE 1 for $$0\leq\theta\leq\frac{\pi}{2}$$

the error in the output voltage being plotted against the input voltage V. It will be seen that the maximum error is approximately 0.3 volt and this is, in fact, true for the range $$-\frac{\pi}{2}\leq\theta\leq\frac{\pi}{2}$$

Referring now to FIGURE 3 of the drawing, the circuit of a cosine law function generator comprises a linear resistance path 17 connected between an input terminal 18 that is maintained at a negative potential of 250 volts and a point 19, and a non-linear resistance path 20 connected between an input terminal 21 and the point 19. The arrangement is such that when an input voltage V is applied to the input terminal 21 the current at the point 19 is made up of two components, the first current component due to the linear path 17 which is proportional to unity (that is to say to the first term in the expansion of cos $\theta$) whilst the second current component is due to the non-linear path 20 and is proportional to $$-\left(\frac{\theta^2}{2!}-\frac{\theta^4}{4!}+\frac{\theta^6}{6!}-\dots\right)$$

These two current components are added by an amplifier 22, similar to the amplifier 5, having a feedback resistor 23 so that the voltage appearing at an output terminal 24 is proportional to the sum $$1-\left(\frac{\theta_2}{2!}-\frac{\theta^4}{4!}+\frac{\theta^6}{6!}-\dots\right)$$

i.e.

$$1-\frac{\theta^2}{2!}+\frac{\theta^4}{4!}-\frac{\theta^6}{6!}+\dots$$

that is to say is proportional to cos $\theta$.

Considering now the non-linear path 20 in more detail it includes two paths connected in parallel between the input terminal 21 and a point 25, the first path comprising a sign-changer generally designated by the reference numeral 26 and made up of an amplifier 27, similar to the amplifier 5, with equal input and feedback resistors 28 and 29 respectively, and a diode 30, the cathode 31 of the diode 30 being connected to the point 25. The second path comprises a diode 32, the cathode 33 of which is connected to the point 25.

The purpose of the two parallel connected paths is to ensure that whether the input voltage V applied to the input terminal 21 is positive or negative the voltage appearing at the point 25 is positive, this being essential if the cosine law function generator described is to work in the range $$-\frac{\pi}{2}\leq\theta\leq\frac{\pi}{2}$$

since the output must always be of the same sign.

The remainder of the non-linear path 20 comprises a non-linear resistor 34, a resistor 35, and a non-linear resistor 36 connected in series between the points 25 and 19, a resistor 37 being connected in parallel with the resistor 35 and the non-linear resistor 36. For the non-linear resistors 34 and 36:

$$K=8.4\times10^{-10}$$
$$\alpha=3.4$$

and the resistance of each is 100 kilohms, the values all being measured with a voltage across the non-linear resistors 34 and 36 of 50 volts.

The linear path 17 comprises a single resistor 38 connected between the input terminal 18 and the point 19. The values of the resistors are as follows:

| | |
|---|---|
| Resistor 23 | 400 kilohms. |
| Resistor 28 | 1 megohm. |
| Resistor 29 | 1 megohm. |
| Resistor 35 | 360 kilohms. |
| Resistor 37 | 200 kilohms. |
| Resistor 38 | 1 megohm. |

The current appearing at the point 19 due to the non-linear path 20 is principally dependent upon the square term in the expansion of cos $\theta$ with slight modifications due to the remaining terms of the series, and this current will be added to the current appearing at the point 19 due to the linear path 17, by the amplifier 22. With the arrangement shown in FIGURE 3 of the drawings an input voltage V, which is proportional to the input angle $\theta$, applied to the input terminal 21 will result in a voltage 100 cos $\theta$ appearing at the output terminal 24.

The error curve (not shown) for the cosine law function generator of FIGURE 3 is similar in magnitude to the error curve (shown in FIGURE 2) for the sine law function generator of FIGURE 1. The maximum error is again approximately 0.3 volt and this is true for the range $$-\frac{\pi}{2}\leq\theta\geq\frac{\pi}{2}$$

Although the cosine law function generator has been described as a separate unit it will be appreciated that a cosine law may be generated by a sine law function generator if the input voltage is proportional to $$\left|\frac{\pi}{2}-\theta\right|$$

Tangent, cotangent, secant and cosecant law function generators may be constructed using similar general principles to those employed in the sine and cosine law function generators described above. Due to the fact that the series expansions of a tangent and of a cosecant have a linear term the tangent and cosecant law function generators will be generally similar to the sine law function generator, whilst as the series expansions of a cotangent and of a secant have a constant term the cotangent and secant law function generators will be generally similar to the cosine law function generator.

Generally speaking the interchange of input and feedback networks in any of the trigonometrical function generators described above will give rise to the inverse function.

The conversion of the sine law function generator of FIGURE 1 to an inverse sine law function generator is shown in FIGURE 4 of the drawings in which the broken rectangle 51 represents the circuit shown within the broken rectangle 51 of FIGURE 1. In addition parts of the circuit of FIGURE 1 which also appear in FIGURE 5 have been denoted by similar reference numerals.

In the inverse sine law function generator of FIGURE 5 a resistor 52 connected between an input terminal 53 and the input side of the amplifier 5 is provided in place of the resistor 6 of the circuit of FIGURE 1. The value of the resistor 52 is the same as was the value of the resistor 6 of the circuit of FIGURE 1. The circuit of the inverse sine law function generator is completed by a feedback loop 54 connected between the output terminal 7 and the input terminal 3. In fact, the terminal 3 may then be dispensed with.

With this arrangement an input voltage $x$ applied to the input terminal 53 can be arranged to give rise to an output voltage, proportional to the angle lying between $-\pi/2$ and $+\pi/2$ whose sine is $x$, appearing at the output terminal 7.

FIGURE 5 of the drawing shows an inverse cosine law function generator. A slight complication arises in connection with this circuit because there will always be two angles lying between $-\pi/2$ and $+\pi/2$ which have the same value of cosine. For this reason it is only possible for an inverse cosine law function generator to operate in one quadrant and therefore in converting the cosine law function generator of FIGURE 3 the sign-changer 26 and the diodes 30 and 32 are omitted. Apart from this however the circuits are similar and parts of the circuit of FIGURE 3 which also appear in FIGURE 6 have been denoted by similar reference numerals.

In the inverse cosine law function generator FIGURE 6 a resistor 55 connected between an input terminal 56 and the input side of the amplifier 52 is provided in place of the resistor 23 of the circuit of FIGURE 3. The value of the resistor 55 is the same as was the value of the resistor 23 of the circuit of FIGURE 3. The circuit of the inverse cosine law function generator is completed by a feedback loop 57 connected between the output terminal 24 and the input terminal 21. In fact, the terminal 21 may then be dispensed with.

With this arrangement a constant negative voltage applied to the input terminal 18 and a positive input voltage $y$ applied to the input terminal 56 can be arranged to give rise to an ouput voltage, proportional to the angle lying between 0 and $\pi/2$ whose cosine is $y$, appearing at the output terminal 24. If the input voltage $y$ is negative the constant voltage applied to the input terminal 18 will have to be positive.

Although the power series expansions of the trigonometrical functions contain only odd or even powers the present invention is not limited to function generators for generating functions in which this is the case.

Referring now to FIGURE 6 of the drawings this shows an exponential function generator for generating the exponential series $$e^x=1+\frac{x}{1!}+\frac{x^2}{2!}+\frac{x^3}{3!}+\cdots$$

and this circuit may be taken as a general example of a function generator for generating a function which may be expanded as a convergent power series having both a constant and a linear term.

The exponential function generator comprises a linear path 62 and a non-linear path 63 connected in parallel between an input terminal 64 and a point 65. Between the point 65 and an ouput terminal 66 is connected an adding circuit comprising an amplifier 67, similar to the amplifier 5, having a feedback resistor 68. In addition, a second input terminal 69 is provided, this input terminal 69 being connected to the point 65 by way of a resistor 70.

The linear path 62 includes a single resistor 71 whilst the non-linear path 63 comprises a non-linear resistor 72, having a resistor 73 in parallel with it, the non-linear resistor 72 being fed by a potential divider generally designated by the reference numeral 74. The potential divider 74 is made up of a resistor 75 connected between the input terminal 64 and the non-linear resistor 72 and a resistor 76 which shunts the junction of the resistor 75 and the non-linear resistor 72 to earth.

In operation a constant positive voltage is applied to the input terminal 69 and the positive input voltage corresponding to the exponential function which is to be generated is applied to the input terminal 64. Three components of current therefore arrive at the point 65: a first constant component due to the constant voltage applied to the input terminal 69 and corresponding to the constant term in the series expansion of $e^x$; a second component due to the linear path 62 corresponding to the linear term in the expansion; and a third component due to the non-linear path 63 corresponding to the square and higher power terms of the expansion. These three components are added by the adding circuit so that the negative voltage appearing at the output terminal 66 is proportional to the required exponential function of the input voltage.

If a suitable positive voltage is applied to the input terminal 69 and a positive voltage $x$ is applied to the input terminal 64 an output voltage proportional to $-e^{1x1}$ will appear at the output terminal 66. If the voltages applied to the input terminals are both negative then an output voltage proportional to $+e^{1x1}$ will appear at the output terminal 66.

This latter case should be distinguished from that in which the power to which $e$ is to be raised is negative, $$\left(e^{-x}=1-\frac{x}{1!}+\frac{x^2}{2!}-\frac{x^3}{3!}+\cdots\right)$$

for in that case the voltage applied to the input terminal 69 must be opposite in polarity to the voltage applied to the input terminal 64. In addition, due to the alternating signs in the series the non-linear path 63 will have to be modified.

The exponential function generator of FIGURE 8 of the drawings may be converted to an inverse exponential function generator by the interchange of the input and feedback networks in a manner similar to that previously described for the trigonometrical function generators.

I claim:

1. A function generator comprising an input terminal to which an input voltage is arranged to be supplied, an output terminal, an adding circuit including an amplifier having an input and an output, a direct connection between the output of said amplifier and said output terminal, and circuit means including a path connecting said output terminal to the input of said amplifier, first means arranged to supply to the input of said amplifier in dependence upon said input voltage a first current which is proportional to the first term in a convergent power series, and second means arranged to supply to the input of said amplifier in dependence upon said input voltage a second current which is proportional to the sum of the second and successive terms in said power series, said second means including a non-linear resistance having an input and an output and having a current/voltage characteristic substantially of the form $I=KV^{\alpha}$, where I is the current flowing in said non-linear resistance for a voltage V between its input and output, K is a constant, and $\alpha$ is a constant for a range of values of V, said adding circuit adding said first and second currents and supplying to said output terminal an output voltage which is proportional to the required function of said input voltage.

2. A function generator in accordance with claim 1 wherein the non-linear resistor is formed of silicon carbide.

3. A function generator in accordance with claim 2 wherein the non-linear resistance is a disc of silicon carbide which has been dried and then sealed to prevent the ingress of moisture.

4. A function generator in accordance with claim 3 wherein the disc of silicon carbide is sealed in an epoxy-resin plastic material.

5. A trigonometrical function generator, the power series expansion of the trigonometrical function to be generated having a linear term, said generator comprising an input terminal to which an input voltage is arranged to be supplied, an output terminal, and adding circuit including an amplifier having an input and an output, a direct connection between the output of said amplifier and said output terminal, and circuit means including a first path connecting said output terminal to the input of said amplifier, a second path connecting said input terminal to the input of said amplifier, said second path including a first linear resistance and being arranged to supply to the input of said amplifier in dependence upon said input voltage a first current which is proportional to the linear term in said power series, and a third path connecting said input terminal to the input of said amplifier, said third path including a non-linear resistance having an input and an output and having a current/voltage characteristic substantially of the form $I=KV^{\alpha}$, where I is the current flowing in said non-linear resistance for a voltage V between its input and output, K is a constant, and $\alpha$ is a constant for a range of values of V, and being arranged to supply to the input of said amplifier in dependence upon said input voltage a second current which is proportional to the sum of the cubic and higher power terms in said power series, said adding circuit adding said first and second currents and supplying to said output terminal an output voltage which is proportional to the required trigonometrical function of said input voltage.

6. A trigonometrical function generator in accordance with claim 5 wherein the third path includes a sign-changing circuit, a first non-linear resistance, a second linear resistance, and a second non-linear resistance connected in series in that order between said input terminal and the input of the amplifier, and a third linear resistance connected in parallel with said second non-linear resistance, said first and second non-linear resistances each having and input and an output and having a current/voltage characteristic substantially of the form $I=KV^{\alpha}$, where I is the current flowing in said non-linear resistance for a voltage V between its input and output, K is a constant, and $\alpha$ is a constant for a range of values of V.

7. A trigonometrical function generator in accordance with claim 6 wherein the first and second non-linear resistances are both formed of silicon carbide.

8. A trigonometrical function generator in accordance with claim 7 wherein the non-linear resistances are discs of silicon carbide which have been dried and then sealed to prevent the ingress of moisture.

9. A trigonometrical function generator in accordance with claim 8 wherein the discs of silicon carbide are sealed in an epoxy-resin plastic material.

10. A trigonometrical function generator, the series expansion of the trigonometrical function to be generated having a constant term, comprising: first and second input terminals; an output terminal; an adding circuit of the kind formed by an amplifier, said amplifier having an input and an output and said amplifier output being connected to said output terminal, and a feedback path which is connected between said amplifier output and input; a first path connected between said first input terminal and said amplifier input, said first path including a linear impedance and being arranged to supply a first input current proportional to the constant term in said series expansion to said amplifier input in dependence upon a constant first input voltage supplied to said first input terminal; and a second path connected between said second input terminal and said amplifier input, said second path including a non-linear impedance and being arranged to supply a second input current proportional to the square and higher power terms of said series expansion to said amplifier input in dependence upon a second input voltage supplied to said second input terminal, the arrangement being such that the output from said adding circuit is substantially proportional to the sum of said first and second currents and is consequently approximately proportional to the required trigonometrical function of said second input voltage.

11. A trigonometrical function generator according to claim 10 wherein the feedback path connected between said amplifier output and input comprises a first linear resistor.

12. A trigonometrical function generator according to claim 11 wherein said linear impedance in the first path is a second linear resistor.

13. A trigonometrical function generator according to claim 12 wherein said second path includes two non-linear impedances in series, one of said non-linear impedances having its current/voltage characteristic modified by the addition of series and parallel linear resistors.

14. A trigonometrical function generator according to claim 12 wherein said second path includes, in series, a first non-linear impedance, a third linear resistor, and a second non-linear impedance, said third linear resistor and said second non-linear impedance having a common terminal and a fourth linear resistor being connected between those terminals of the third linear resistor and of the second non-linear impedance which are not common.

15. A trigonometrical function generator according to claim 12 wherein said second path includes first and second parallel-connected branches, said first branch including a sign-changing circuit and a first rectifier element and said second branch including a second rectifier element, said first and second rectifier elements being poled so that, in operation, the polarity of said second input current is opposite to the polarity of said first input current independent of the polarity of said second input voltage.

16. A trigonometrical function generator according to claim 15 wherein said sign-changing circuit comprises an amplifier which has equal series and feedback linear resistors.

17. A trigonometrical function generator according to claim 10 wherein the non-linear impedance is a non-linear resistance having an input and a output and having a current/voltage characteristic substantially of the form $I=KV^{\alpha}$, where I is the current flowing in said non-linear resistance for a voltage V between its input and output, K is a constant, and $\alpha$ is a constant for a range of values of V.

18. A trigonometrical function generator according to claim 17 wherein the non-linear resistance is formed of silicon carbide.

19. An inverse trigonometrical function generator, the expansion of the trigonometrical function corresponding to the inverse trigonometrical function to be generated having a linear term, comprising: an input terminal; an output terminal; an amplifier having an input and an output, said amplifier output being connected to said output terminal; an input path connected between said input terminal and said amplifier input, said input path including a linear impedance and being arranged to supply an input current to said amplifier input in dependence upon an input voltage supplied to said input terminal; and first and second feedback paths connected in parallel between said amplifier output and said amplifier input, said first feedback path including a linear impedance and being arranged to feed back a current which is approximately proportional to the linear term in said series expansion, and said second feedback path including a non-linear impedance and being arranged to feed back a current which is approximately proportional to the sum of the second and successive terms (that is to say the odd power terms starting with the third power) in said series expansion, so that the output from the said amplifier is approximately proportional to said inverse trigonometrical function of said input voltage.

20. An inverse trigonometrical function generator according to claim 19 wherein said linear impedance in the input path is a first linear resistor.

21. An inverse trigonometrical function generator according to claim 20 wherein said linear impedance in the first feedback path is a second linear resistor.

22. An inverse trigonometrical function generator according to claim 21 wherein said second feedback path includes, in series, a sign-changing circuit and two non-linear impedances, one of said non-linear impedances having its current/voltage characteristic modified by the addition of series and parallel linear resistors.

23. An inverse trigonometrical function generator according to claim 22 wherein said sign-changing circuit comprises an amplifier which has equal series and feedback linear resistors.

24. An inverse trigonometrical function generator according to claim 19 wherein the non-linear impedance is a non-linear resistance having an input and an output and having a current/voltage characteristic substantially of the form $I=KV^{\alpha}$, where I is the current flowing in said non-linear resistance for a voltage V between its input and output, K is a constant, and $\alpha$ is a constant for a range of values of V.

25. An inverse trigonometrical function generator according to claim 24 wherein the non-linear resistance is formed of silicon carbide.

26. An inverse trigonometrical function generator, the expansion of the trigonometrical function corresponding to the inverse trigonometrical function to be generated having a constant term, comprising: first and second input terminals; an output terminal; an amplifier having an input and an output, said amplifier output being connected to said output terminal; a first input path connected between said first input terminal and said amplifier input, said first input path including a first linear impedance and being arranged to supply an input current to said amplifier input in dependence upon a first input voltage supplied to said first input terminal; a second input path connected between said second input terminal and said amplifier input, said second input path including a second linear impedance and being arranged to supply a second input current approximately proportional to the constant term in said series expansion to said amplifier input in dependence upon a second input voltage supplied to said second input terminal; and a feedback path connected between said amplifier output and said amplifier input, said feedback path including a non-linear impedance and being arranged to feed back a current which is approximately proportional to the sum of the second and successive terms (that is to say the even power terms starting with the second power) in said series expansion, so that the output from said amplifier is approximately proportional to said inverse trigonometrical function of said second input voltage.

27. An inverse trigonometrical function generator according to claim 26 wherein said first linear impedance in the first input path is a first linear resistor.

28. An inverse trigonometrical function generator according to claim 27 wherein said second linear impedance in the second input path is a second linear resistor.

29. An inverse trigonometrical function generator according to claim 28 wherein said feedback path includes two non-linear impedances in series, one of said non-linear impedances having its current/voltage characteristic modified by the addition of series and parallel linear resistors.

30. An inverse trigonometrical function generator according to claim 28 wherein said feedback path includes, in series, a first non-linear impedance, a third linear resistor, and a second non-linear impedance, said third linear resistor and said second non-linear impedance having a common terminal and a fourth linear resistor being connected between those terminals of the third linear resistor and of the second non-linear impedance which are not common.

31. An inverse trigonometrical function generator according to claim 26 wherein the non-linear impedance is a non-linear resistance having an input and an output and having a current/voltage characteristic substantially of the form $I=KV^{\alpha}$, where I is the current flowing in said non-linear resistance for a voltage V between its input and output, K is a constant, and $\alpha$ is a constant for a range of values of V.

32. An inverse trigonometrical function generator according to claim 31 wherein the non-linear resistance is formed of silicon carbide.

33. An exponential function generator comprising: first and second input terminals; an output terminal; an adding circuit of the kind formed by an amplifier, said amplifier having an input and an output and said amplifier output being connected to said output terminal, and a feedback path which is connected between said amplifier output and input; a first path connected between said first input terminal and said amplifier input, said first path including a linear impedance and being arranged to supply a first input current approximately proportional to the constant term in the exponential series to be generated to said amplifier input in dependence upon a constant first input voltage supplied to said first input terminal; a second path connected between said second input terminal and said amplifier input, said second path including a linear impedance and being arranged to supply a second input current approximately proportional to the linear term in said exponential series to said amplifier input in dependence upon a second input voltage supplied to said second input terminal; and a third path connected between said second input terminal and said amplifier input, said third path including a non-linear impedance and being arranged to supply a third input current approximately proportional to the square and higher power terms in said exponential series to said amplifier input in dependence upon said second input voltage supplied to said second input terminal, the arrangement being such that the output from said adding circuit is substantially proportional to the sum of said first, second and third input currents and is consequently approximately proportional to the required exponential function of said second input voltage.

34. An exponential function generator according to claim 33 wherein the feedback path connected between said amplifier output and input comprises a first linear resistor.

35. An exponential function generator according to claim 34 wherein said linear impedance in the first path is a second linear resistor.

36. An exponential function generator according to claim 35 wherein said linear impedance in the second path is a third linear resistor.

37. An exponential function generator according to claim 36 wherein said third path includes a potential divider connected between said second input terminal and earth, a non-linear impedance connected between a point on said potential divider and said amplifier input, and a fourth linear resistor in parallel with said non-linear impedance.

38. An exponential function generator according to claim 33 wherein the non-linear impedance is a non-linear resistance having an input and an output and having a current/voltage characteristic substantially of the form $I=KV^{\alpha}$, where I is the current flowing in said non-linear resistance for a voltage V between its input and output, K is a constant, and $\alpha$ is a constant for a range of values of V.

39. An exponential function generator according to claim 38 wherein the non-linear resistance is formed of silicon carbide.

References Cited in the file of this patent

UNITED STATES PATENTS

| | | |
|---|---|---|
| 2,444,770 | Fyler | July 6, 1948 |
| 2,595,185 | Zauderer et al. | Apr. 29, 1952 |
| 2,643,348 | De Boisblanc et al. | June 23, 1953 |
| 2,698,134 | Agins | Dec. 28, 1954 |
| 2,781,967 | Spencer et al. | Feb. 17, 1957 |
| 2,890,832 | Stone | June 16, 1959 |
| 3,031,143 | McCoy et al. | Apr. 24, 1962 |

OTHER REFERENCES

Radio and Television News (Munster) October 1950, pp. 8A and 9A.

Tele-Tech & Electronic Industries (Levenstein) October 1953; pp. 76–78.

IRE Transactions-Electronic Computers (Kovach et al. I) June 1954; pp. 42–45.

Proc. of the IEE (Burt et al.) June 1955, pp. 51–58.

Electronic Engineering (Brown et al.) March 1958; pp. 154–157.

IRE Transactions-Electronic Computers (Kovach et al. II) June 1958, pp. 91–96.

A Palimpsest on the Electronic Analog Art (Edited by Paynter) 1955, page 107.